United States Patent [19]

Annamalai

[11] Patent Number: 4,890,304
[45] Date of Patent: Dec. 26, 1989

[54] RELIABLE RECOVERY OF DATA IN ENCODER/DECODER

[75] Inventor: Kadiresan Annamalai, Milpitas, Calif.

[73] Assignee: Advanced Micro Devices, Inc., Sunnyvale, Calif.

[21] Appl. No.: 268,396

[22] Filed: Nov. 7, 1988

[51] Int. Cl.⁴ .............................................. H04L 7/00
[52] U.S. Cl. .................................... 375/114; 375/113; 370/100.1
[58] Field of Search ............... 375/106, 113, 114, 116; 370/100, 108; 328/63; 358/319; 340/825.2

[56] References Cited

U.S. PATENT DOCUMENTS

| | | | |
|---|---|---|---|
| 4,135,156 | 1/1979 | Sanders, Jr. et al. | 370/57 |
| 4,356,566 | 10/1982 | Wada et al. | 375/116 |
| 4,414,677 | 11/1983 | Ive et al. | 375/116 |
| 4,596,981 | 6/1986 | Ueno et al. | 375/106 |
| 4,646,329 | 2/1987 | Bojarski | 375/113 |
| 4,701,912 | 10/1987 | Bueno et al. | 370/99 |

Primary Examiner—Robert L. Griffin
Assistant Examiner—Stephen Chin
Attorney, Agent, or Firm—Joseph A. Sawyer, Jr.

[57] ABSTRACT

A system for adjusting the synchronizing signal received by an ENDEC receiver in a token ring network is disclosed. The system used lookahead logic in conjunction with the packet delimiter byte to adjust the synchronizing signal without delaying any bits received by the ENDEC receiver. This system has significant utility in Fiber Distributed Data Interface (FDDI) networks.

5 Claims, 5 Drawing Sheets

ENDEC-RECEIVER BLOCK DIAGRAM

ENDEC-RECEIVER BLOCK DIAGRAM

RELIABLE RECOVERY OF DATA IN ENCODER/DECODER

FIELD OF INVENTION

This invention relates to the serial transmission of digital data, and more particularly, to synchronization of bytes of serial data received over a local area network.

BACKGROUND OF THE INVENTION

In local area networks, when a node joins the network, the first stream of signals it receives are connection management symbols. The symbols are especially chosen so that they can be decoded by an encoder/decoder (ENDEC) of the node without regard to their alignment within a byte of the signal stream. In a standard 5-bit/4-bit ENDEC, the start of the connection management symbols can be at any one of the 10 bits within the "byte." Decoding of these connection management symbols proceeds without regard to this alignment because of their chosen nature. However, once these symbols are processed, decoding of the data packet following these symbols requires that their "bytes" be aligned.

Typically, the required alignment was provided by the detection of a packet delimiter called a "JK" symbol-pair. Under this procedure, a preamble "byte" immediately preceding the "JK" symbol-pair could be misinterpreted; being a decoded byte.

Also, because of the manner in which an elastic buffer is used in a typical ENDEC, the elastic buffer is centered upon detection of the "JK" delimiter. During that time, a few bits in the byte-stream are dropped or added to compensate for clock differences between the upstream of local station, resulting in a non-integral number of bytes in the preamble.

For a token ring Fiber Distributed Data Interface (FDDI) networks, the physical layer has to reliably decode the incoming data stream, without any deletion or modification of frame bits. Also, the receiver is allowed to delete only few bits of IDLE for compensation of clock differences, so as to ensure a minimum number of preambles before a packet.

The physical layer of the FDDI is implemented by a combination of Encoder/Decoder (ENDEC) and fiber optic transceiver. The encoder performs repeat filter, 4B/5B encoding, parallel to serial conversion, and Non-Return to Zero (NRZ) to Non-Return to Zero Invert (NRZI) Code conversion. The decoder performs NRZI to NRZ conversion, clock recovery, serial to parallel conversion, byte alignment, 5B/4B code conversion, elasticity buffer function and line state decode.

ENDEC is implemented in Silicon by means of a two chip set called an ENDEC chip and ENDEC Data Separator. The ENDEC chip performs the encoder, control and status functions, and all the decoder functions, and line state detect function. The ENDEC Data Separator performs recovery of clock and retimes the data from the received data. In a FDDI system, there will be a plurality of ENDECs located as a token ring. In such a system each of the ENDECs have their own clock frequencies. For example, the FDDI standard requires that the clock frequency of the ENDEC is in the range of 125 Mhz+/−6.25 KHz. This 12.5 KHz range may significantly affect the information being transmitted or received unless the information received by the receive ENDEC is synchronized with the frequency of the transmitted information.

Typically, this synchronization is accomplished by deleting or adding IDLE bits of information by the receive ENDEC. The problem with this approach is that when bits are deleted from the incoming signal there is a possibility that actual data will be deleted if there are not enough IDLE bits in the incoming signal. Therefore, by deleting bits, there is a significant chance that the information may not be accurate.

Therefore, what is needed is a system for transferring information in a token ring network in a FDDI system such that the clock frequency of the data information is accurate. It is also necessary to provide a system in which the incoming data information to an ENDEC chip is synchronized without deleting any bits of information. The present invention provides such an ENDEC.

SUMMARY OF THE INVENTION

A method and apparatus provided for decoding digital signals associated with the ENDEC receiver is disclosed. The apparatus comprises means for generating a recovered clock signal from the digital signals and converting the digital signals according to a predetermined code. The apparatus also includes means for generating a synchronizing signal aligned with the start of a packet delimiter.

Coupled to synchronizing signal generating means is means for adjusting the synchronizing signal responsive to the detection of the delimiter during a predetermined period. Decoding and generating means respond to the synchronizing signal and the converted serial digital signals to provide the decoded bit signals.

Through the present invention, no information is deleted from the ENDEC receiver. Accordingly, the apparatus and method of the present invention has significant advantages over previously known techniques.

DETAILED DESCRIPTION

The present invention comprises a novel receiver portion of an encoder/decoder. The following description is presented to enable any person skilled in the art to make use of the invention and is provided in the context of a particular application and its requirements. Various modifications to the embodiment will be readily apparent to those of ordinary skill in the art and the generic principles defined herein may be applied to other embodiments and applications without departing from the spirit and scope of the present invention. Thus, the present invention is not intended to be limited to the embodiment shown but is to be accorded the widest scope consistent with the principles and features disclosed herein.

Figure 1:
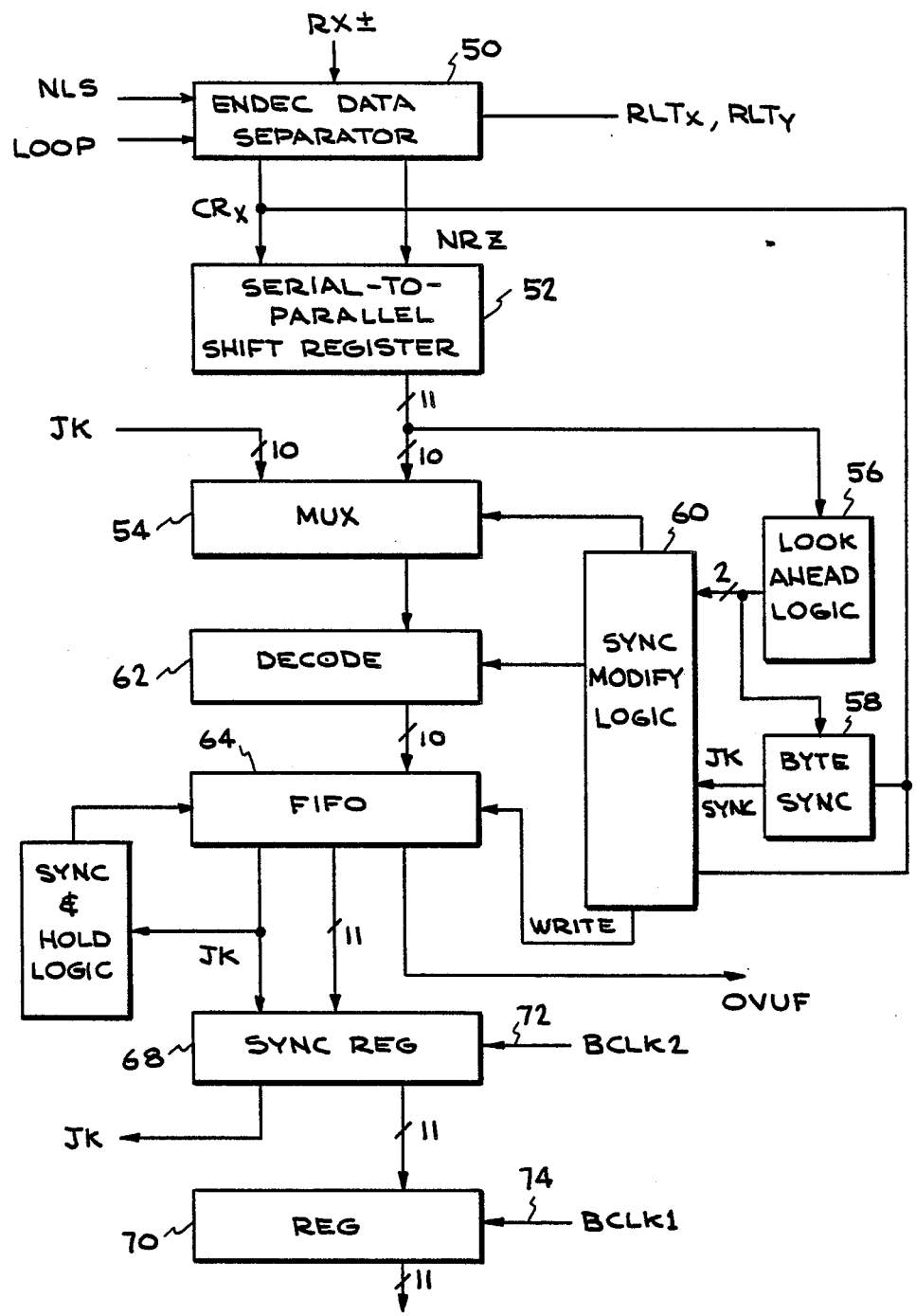
FIG. 1 provides a block diagram of the preferred embodiment of the ENDEC Data Separator and the receiver portion of an encoder/decoder (ENDEC) consistent with the present invention.

A control element, not shown in FIG. 1, provides control signals to the various elements shown in FIG. 1.

Design and implementation of such control elements are well-known to those skilled in the art and, accordingly, will not be described herein. Serial data (Rx) is received on signal line 30 by a clock recovery block called the ENDEC Data Separator 50 which performs clock recovery and non-return-to-zero invert-on-ones (NRZI) to non-return-to-zero (NRZ) conversion. Block 50 generates a receiver clock signal (CRx) and the converted NRZ version of the serial data received on line 30.

The CRx and NRZ signals are conducted to a serial-to-parallel shift register 52 of the receive portion of ENDEC. Shift register 52 produces therefrom ten-bit parallel "bytes" corresponding to ten bits received in series on line 30. The ten-bit "bytes" of data is transferred in parallel to a set of first input terminals to a multiplexer (MUX) 54. MUX 54 also receives in parallel at a set of second input terminals the code of the "JK" delimiter symbol. MUX 54 also receives a control signal (SEL) from sync modify logic 60 which causes either the ten signals representing the 10-bit data "byte" or the "JK" symbol to be generated at a set of ten output terminals of the MUX 54.

The ten-bit data bytes generated by shift register 52, together with the complemented version of the NRZ signal (NRZL) currently applied to the shift register 52, is conducted to a Lookahead Logic Block 56. Lookahead Logic Block 56 generates therefrom two logic signals; a JK1 signal which is set HIGH when a pattern of coded bits representing the JK symbol, shifted by one bit position is present in the shift register 52. A JK2 signal is generated HIGH when the JK pattern, shifted by two bit positions, is present in the shift register 52.

A byte synchronization (BYTE SYNC) block 58 receives the JK1 signal generated by Lookahead Logic Block 56. BYTE SYNC block 58 generates a byte alignment signal JK—SYNC once for every ten bits of serial data received on line 30. BYTE SYNC block 58 synchronizes its generation of the JK—SYNC signal with the reception of the one-bit lookahead signal JK1.

A synchronization modify logic (SYNC MODIFY LOGIC) block 60 receives the JK—SYNC signal generated by BYTE SYNC 58 and the JK1 and JK2 signals generated by LOOKAHEAD LOGIC 56. SYNC MODIFY LOGIC block 60 also receives the CRx timing signal generated by block 50. SYNC MODIFY LOGIC 60 block generates a synchronization (SYNC) signal which is conducted to a DECODE block 62. A ten-bit "byte" selected to be generated at the output of MUX 54 is conducted in parallel to DECODE block 62, synchronized by the SYNC signal. Whenever JK1 is HIGH at the same time JK—SYNC is generated, a new JK symbol is present in the shift register 52 one bit period after the previous byte alignment signal JK—SYNC has been generated. Another SYNC signal is generated by SYNC MODIFY LOGIC 60 two bit counts, i.e., delayed by two CRx signals, from this most recent JK-SYNC.

SYNC MODIFY LOGIC 60 generates a first level of the SEL signal received by MUX 54 during those times that this new SYNC is generated. This first level of SEL causes the MUX 54 to select the signals representing a JK symbol, as is applied to the second set of input terminals of MUX 54, to be conducted to the DECODE 62. At all other times, SYNC MODIFY LOGIC 60 generates a second level of the SEL signal which causes MUX 54 to select the signals representing parallel data, as applied to the first set of input terminals of MUX 54, to be conducted to the DECODE 62.

Whenever JK2 is HIGH, a new JK symbol is present in the shift register 52 two bit times after the previous byte alignment signal JK—SYNC has been generated. The new JK—SYNC signal is delayed one bit count, i.e., delayed by three CRx signals from the previous JK—SYNC, and then SYNC MODIFY LOGIC 60 generates a SYNC signal to DECODE 62. The first level of SEL is similarly generated, as described in the preceding paragraph, causing signals representing the JK symbol-pair to be conducted to DECODE 62 whenever this new SYNC signal is generated.

SYNC MODIFY LOGIC block 60 also generates a WRITE signal which is conducted to a first-in, first-out (FIFO) buffer 64. Received symbols, are decoded in parallel by DECODE 62 and transferred in parallel to FIFO 64, synchronized by the WRITE signal. SYNC MODIFY LOGIC block 60 generates the WRITE signal delayed by three CRx time periods from the generation of the SYNC signal to permit signal stabilization and decoding to proceed.

The SYNC register 68 receives the information from FIFO 64. This information is delivered to SYNC and Hold Logic 76 which is used to read in the data from the FIFO buffer 64 responsive to a byte clock signal 72 to the SYNC register 68. The register 70 clocks in the information from Sync register 68 by a second byte clock signal 74 which is one bit delayed from the first clock signal 72. The parallel information from register 70 is then provided to a media access control layer (not shown) which interprets the received information.

Figure 2:
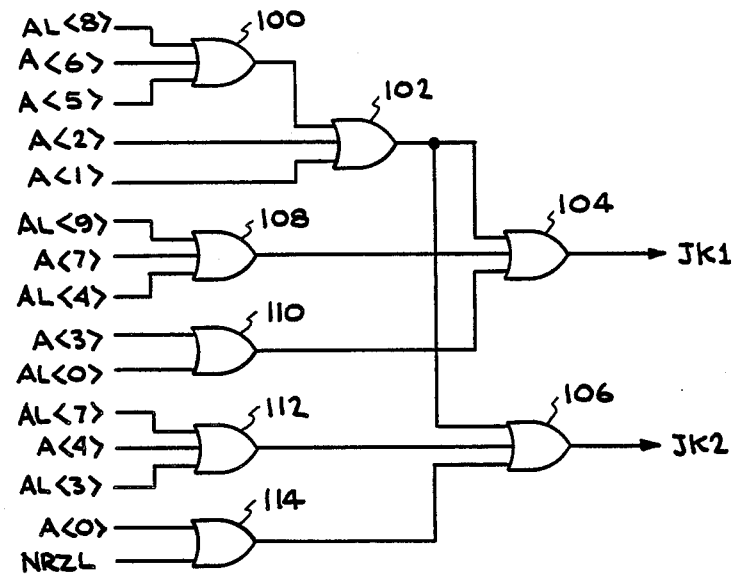
FIG. 2 is a circuit representation of the "lookahead logic" of the present invention.

With reference now to FIG. 2, a logic diagram of the LOOKAHEAD LOGIC block 56 is provided. The ten signals generated in parallel by shift register 52 are denoted thereon as A<9..0>; arrayed from most-significant bit A<9> to least-significant bit A<0>. The complemented values of A<9>, A<8>, A<7>, A<4>, A<3> and A<0> are also shown in FIG. 2 denoted AL<9>, AL<8>, AL<7>, AL<4>, AL<3> and AL<0>, respectively. NRZL is also shown in FIG. 3, being the complemented value of the serial signal NRZ currently applied to the serial input of register 52.

An OR gate 100 receives AL<8>, A<6> and A<5>. An OR gate 102 receives the signal generated by OR gate 100 as well as A<2> and A<1>. The signal generated by OR gate 102 is conducted to a first input of a NOR gate 104 and a first input of a NOR gate 106. NOR gate 104 also receives at a second input a signal generated by an OR gate 108 which in turn receives AL<9>, A<7> and AL<4>. NOR gate 104 receives a third input a signal generated by an OR gate 110 which in turn receives A<3> and AL<0>. NOR gate 106 receives at a second input a signal generated by an OR gate 112 which in turn receives AL<7>, A<4> and AL<3>. NOR gate 106 receives at a third input a signal generated by an OR gate 114 which receives A<0> and NRZL. NOR gates 104 and 106 generate the JK1 and JK2 signals, respectively.

Figure 3:
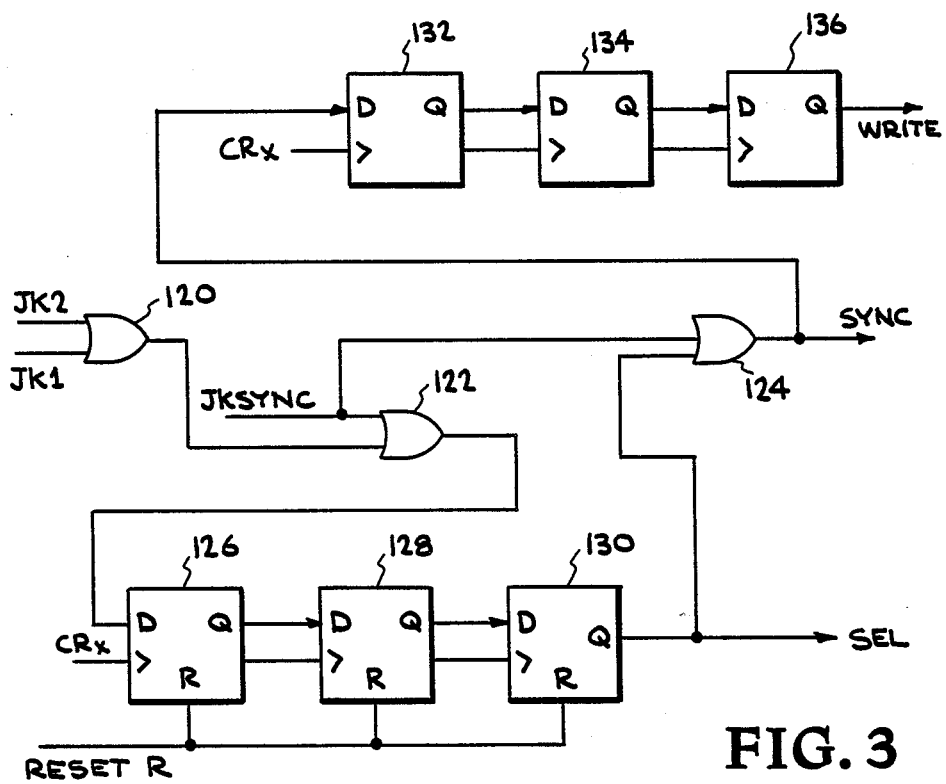
FIG. 3 is a block diagram of the synchronization modify logic of the ENDEC receiver of FIG. 1.

With reference now to FIG. 3 a logic diagram of the SYNC MODIFY LOGIC block 60 (FIG. 1) is provided. The JK1 and JK2 signals generated by LOOKAHEAD LOGIC 56 (FIG. 1) are applied to an OR gate 120; the signal generated thereby is applied to a first input of an AND gate 122. The JK—SYNC signal is applied to a second input of AND gate 122 and to a first input of an OR gate 124. The signal generated by AND gate, 122 is applied to the first stage of a three-stage delay comprising serially coupled delay-type (D) flip-flops 126, 128 and 130.

Flip-flop 120 receives the CRx clock at a clock input, and the Q output of each stage is connected to the D input of the next stage, the signal generated at the Q output of the third-stage flip-flop 130 is the SEL signal. This signal is also conducted to the second input of OR gate 124. Reset signal is applied to serial coupled flip-flop 126-120 to reset the flip-flops during initial powerup. The signal generated by OR gate 124 is the SYNC signal. This signal is also conducted to the first stage of a three-stage delay write comprising serially coupled delay-type (D) flip-flops 132, 134 and 136. Flip-flops 132, 134 and 136 are connected to one another as are flip-flops 126, 128 and 130. The signal generated at the Q output of the third stage flip-flop 136 is the WRITE signal.

Figure 4:
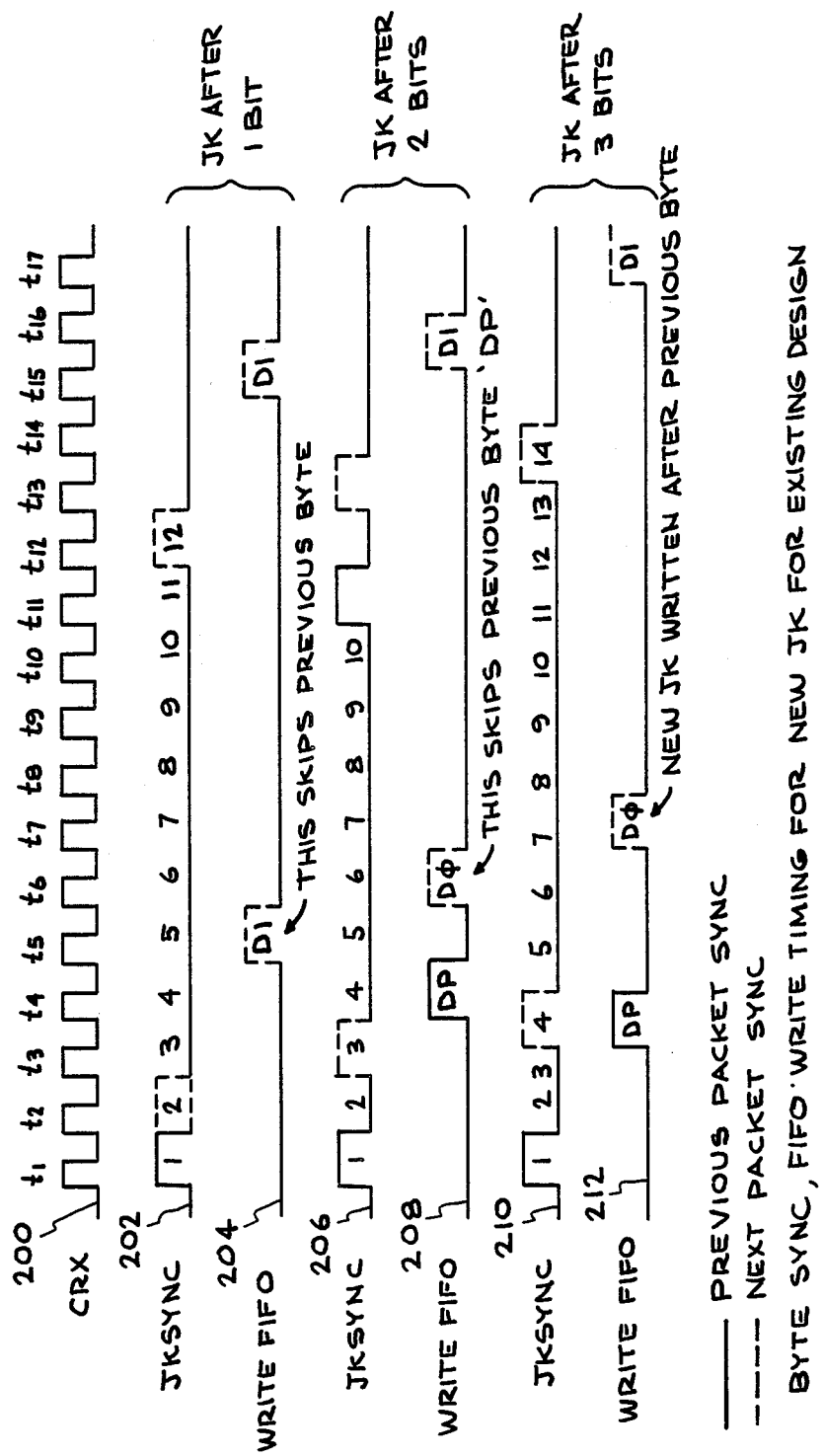
FIG. 4–6 are timing diagrams for the various conditions of the ENDEC receiver of FIG. 1.

The operation of the byte synchronizer of the instant invention is best understood by reference to FIG. 4; a waveform timing diagram of signals described above in connection with FIG. 1. The recovered clock (CRx) signal 200 is shown in FIG. 4, providing a reference for the various other signals shown thereon. The JK_SYNC signal 202 generated by BYTE SYNC 58 is shown as generated at the first CRx signal (t1); this generation being aligned with the previous packet's synchronization. A new JK symbol is detected one bit period after this generation of JK_SYNC; i.e., occurring during the second CRx signal (t2). Thus the next packet's synchronization should be aligned to coincide with this new JK symbol. Hence a JK_SYNC signal should be generated during t2, t12, etc., as shown in FIG. 4 in dashed lines.

Because the WRITE signal to the FIFO 64 is not generated until the third CRx clock following JK_SYNC, the contents of the previous packet has not been transferred to FIFO 64; it is still in DECODE block 62 when the next packet arrives. If no precaution is taken, the last byte of the previous frame is thus overwritten, with attendant loss of data, when the WRITE signal 204 is generated at t5. If a new JK symbol is detected two bit periods after generation of JK_SYNC, as shown by waveform 206 occurring at t3; then again a WRITE signal 208 is generated at t6 also causing the contents of the previous packet to be overwritten.

However, for new JK symbols detected three to nine bit periods after generation of JK_SYNC, as shown by waveform 210, occurring at, for example, t4, then a WRITE signal 212 occurs at t4 permitting the contents of the last byte of the previous packet to be transferred to the FIFO and then another WRITE signal occurs at t7 permitting the contents of the newly-detected packet to be written to the FIFO.

Figure 5:
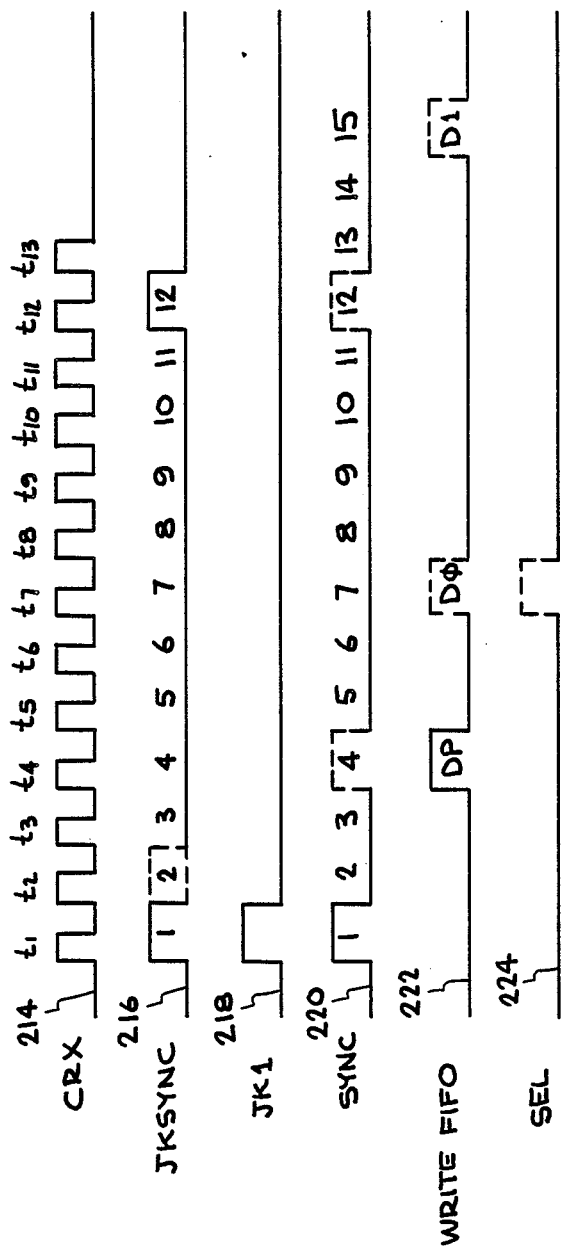

The precaution taken by the byte synchronizer of the instant invention is described in connection with timing waveform diagrams shown as FIG. 5 and FIG. 6. The SYNC MODIFY LOGIC block 60 generates the SYNC, SEL and WRITE FIFO signals in response to JK_SYNC and the JK1 and JK2 signals generated by BYTE SYNC 58 and LOOKAHEAD LOGIC 56, respectively, as shown in FIGS. 5 and 6.

The timing according to the instant invention when a new JK is detected one bit period after the previous JK_SYNC signal is described with reference to FIG. 5. The CRx signal 214 is used to provide a reference for the other signals. The JK_SYNC signal 216 is shown in FIG. 6 as occurring during the first CRx time period t1 and again during the second CRx time period t2, as was described in connection with waveforms 202 and 204 of FIG. 4. Because of the one-bit interval between the previous JK_SYNC and the new JK symbol, LOOKAHEAD LOGIC block 56 generates a JK1 signal 218 during time period t1.

The presence of JK_SYNC during t1 causes a SYNC signal 220 to be generated during t1 by SYNC MODIFY LOGIC 60, and a WRITE signal 222 to be generated during t4; i.e., delayed by three CRx clock periods. Accordingly, the contents of the last byte of the previous packet is decoded and written to FIFO 64. The generation of JK1 during time period t1, along with the presence of JK_SYNC during t1 causes a SYNC signal to be generated during t4 causing the contents of the newly-arrived packet to be written to FIFO 64. In this manner, overwriting of the last byte of the previous packet is avoided.

Figure 6:
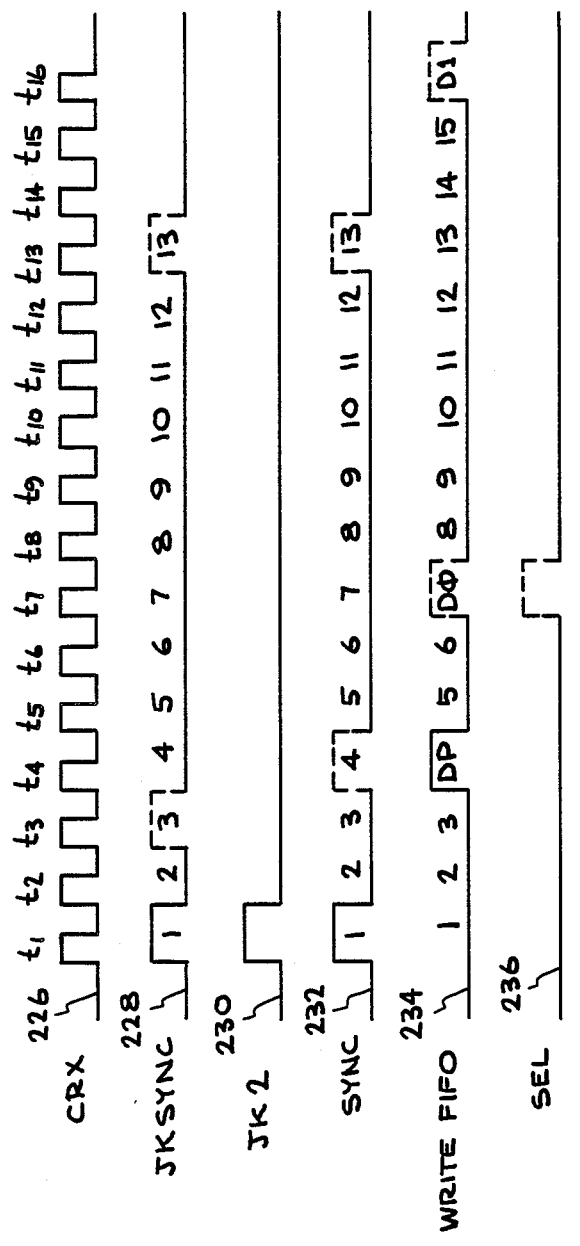

The situation when a new JK is detected during the second bit period following the previous JK_SYNC signal is shown in waveform timing diagram of FIG. 6. Again the CRx waveform 226 is used in FIG. 6 for reference. The JK_SYNC signal 228 is shown in FIG. 6 as occurring during the first CRx time period t3, as was described in connection with waveforms 206 and 208 of FIG. 4. Because of the two-bit interval between the previous JK SYNC and the new JK symbol, LOOKAHEAD LOGIC block 56 generates a JK2 signal 230 during time period t1.

The presence of JK_SYNC during t1 causes a SYNC signal 232 to be generated during t1 by SYNC MODIFY LOGIC 60, and a WRITE signal 234 to be generated during t4. Accordingly, the contents of the last byte of the previous packet is decoded and written to FIFO 64. The generation of JK2 during time period t1, along with the presence of JK_SYNC during t1 causes a SYNC signal to be generated during t4 causing the contents of the newly-detected packet to be transferred to DECODE 62.

A WRITE signal is then generated during t7, causing the contents of the newly-arrived packet to be written to FIFO 64. SYNC MODIFY LOGIC block 60 also generates the SEL signal 224 and 238 at t7 in FIGS. 5 and 6, respectively, which causes MUX 54 to apply the JK delimiter symbol to the DECODE 62 input terminals. In this manner, overwriting of the last byte of the previous packet is avoided by the instant invention.

The above described embodiment can be modified in a variety of ways and those modifications would still be within the spirit and scope of the present invention. Thus, while this invention has been disclosed by means of a specific illustrative embodiment the principles thereof are capable of a wide range of modifications by those of ordinary skill in art within the scope of the following claims.

What is claimed is:

1. A method of adjusting a synchronizing signal aligned with a start-of-packet delimiter for serially-received digital signals from a network; said serially-received digital signals having a predetermined inter-bit period, comprising the steps:
   (a) converting said serially-received digital signals into plural-bit parallel words;
   (b) detecting occurrence of said delimiter during the nth inter-bit period following the most-recent occurrence of said synchronizing signal; and
   (c) generating said adjusted synchronizing signal at the time of detection of step (b) if $n > 2$;

delayed by one said inter-bit period from the time of detection of step (b) if n=2; or delayed by two said inter-bit periods from the time of detection of step (b) if n=1.

2. A method according to claim 1 where said plural-bit words are provided to a decoder and then stored in parallel in an elastic buffer, further including the steps:

(d) applying said adjusted synchronizing signal to said decoder; and (e) storing said words in said buffer three said inter-bit periods following application of said signal called for at step (d).

3. Apparatus for decoding serially-received digital signals from a network, said serially-received signals having a predetermined inter-bit period and having a synchronizing signal aligned with a start-of-packet delimiter; and apparatus comprising;

means responsive to said serially received signals for generating a recovered clock signal therefrom and for converting said serially-received signals according to a predetermined code;

means responsive to said recovered clock signal and to said converted serial signals for generating therefrom plural-bit parallel words corresponding to said serially-received signals;

means responsive to said recovered clock signal and to said plural-bit parallel words and to said serially-received signals for generating a synchronizing signal aligned with a start-of-packet delimiter;

means responsive to the synchronizing signal generating means for adjusting the synchronizing signal at the time of detection of a delimiter during a predetermined period; and means responsive to said plural-bit parallel words and to said synchronizing signal for decoding said plural-bit parallel words upon receipt of said synchronizing signal and for generating therefrom signals representing said decoding of said plural-bit words.

4. The apparatus according to claim 3, wherein the decoding and generating also generates a WRITE signal, the adjusting means further including first-in, first-out (FIFO) means responsive to said WRITE signal and said decoded plural-bit words for storing said decoded plural-bit words.

5. The apparatus according to claim 3 wherein said serially-received signals have a start-of-packet delimiter, said adjusting means includes:

LOOKAHEAD means responsive to said plural-bit parallel words and said serially-received signals for detecting said delimited during the inter-bit period next following the most recent occurrence of said synchronizing signal and generating a first detection signal thereupon, and for detecting said delimiter during the inter-bit period following by one inter-bit period the most recent occurrence of said synchronizing signal and generating a second detection signal thereupon;

means responsive to said first and second detection signals and to said recovered clock signal for generating said synchronizing signal aligned with said start-of-packet delimiter, said generating means including; in the absence of said first or second detection signals means for delaying by two said inter-bit periods upon reception of said first detection signal, and means for delaying said first or second detection signals by one said inter-bit period upon reception of said second detection signal.

* * * * *